United States Patent Office 3,444,724
Patented May 20, 1969

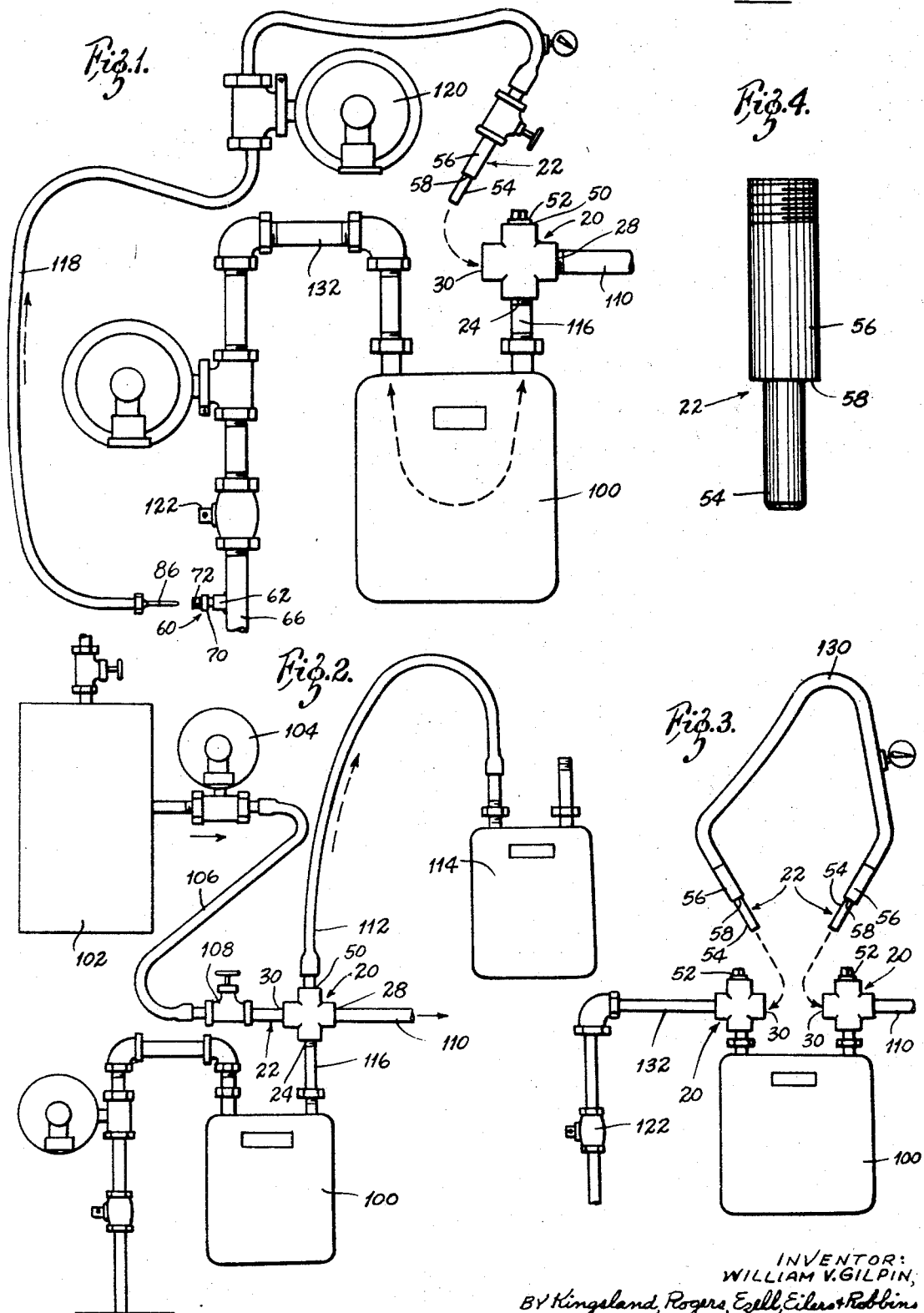

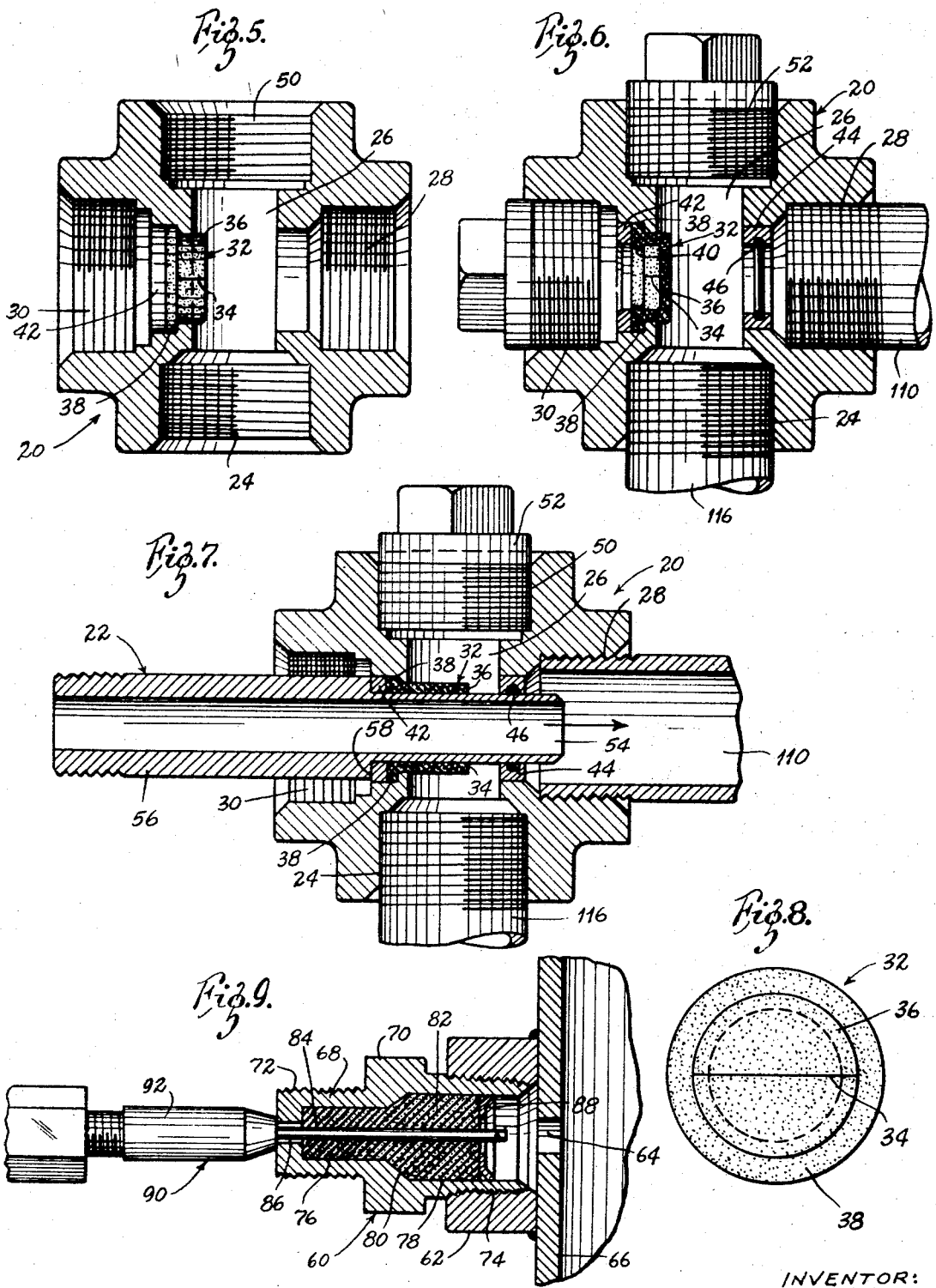

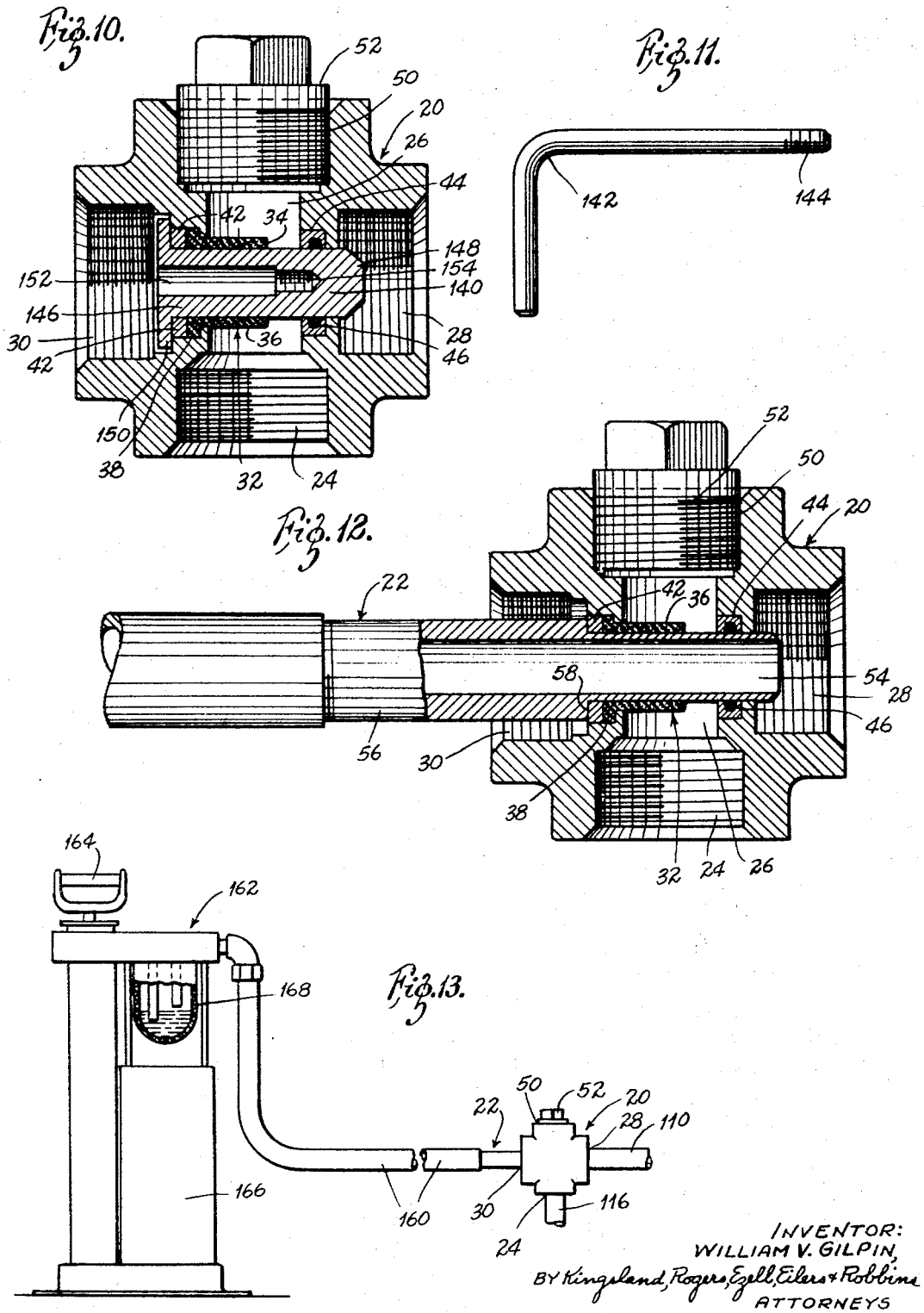

3,444,724
PROBE APPARATUS FOR CHANGING GAS METERS
William V. Gilpin, Albuquerque, N. Mex., assignor to Universal Controls Corporation, Dallas, Tex., a corporation of Texas
Continuation-in-part of application Ser. No. 498,357, Oct. 20, 1965. This application Jan. 18, 1967, Ser. No. 610,188
Int. Cl. G01m 3/08
U.S. Cl. 73—40.5                 4 Claims

ABSTRACT OF THE DISCLOSURE

A fitting having a slitted normally closed resilient valve adapted to be used with a tube probe valve member inserted in the resilient valve means for use in bypassing gas meters that are to be tested or taken out of service. The tube probe may be used with various testing devices for testing the gas line for leaks or for interrupting the gas supply and providing auxiliary gas supplies to the domestic line as desired. The fitting may further be provided with a solid tube probe inserted in the resilient valve means to shut off the flow through the fitting with the provision of unique handle means for inserting the solid probe which cannot be readily counterfeited to avoid tampering.

CROSS REFERENCE TO RELATED APPLICATION

The instant application is a continuation-in-part of my prior co-pending application Ser. No. 498,357, filed Oct. 20, 1965.

BACKGROUND OF THE INVENTION

In the past it has been a custom to take pressure readings by means of a pressure gauge or the like permanently connected into a gas pressure line. Such installations require the use of a permanent gauge with the consequent danger of theft, breakage, maintenance, and high capital investment.

In the past, most gas companies have had a routine meter change-out plan where each and every meter was removed from service after being used for a period ranging from five to fifteen years. This procedure required a gas service man and possibly an assistant and a truck. The usual change-out of a gas meter required that this crew must have access to the house and to the gas burning appliances which were required to be closed before the gas was turned off and the meter removed. After the new meter was installed it was necessary to go back into the house and relight all of the pilots, which was a costly and time consuming procedure. In present day life when the house is unoccupied so much of the time, due to the higher incidence of employment of both husbands and wives, access to a house is quite difficult and several calls may be required, or overtime must be put in, all requiring additional costs.

SUMMARY OF THE INVENTION

By means of the instant invention, there has been provided a tube probe valve, together with a specially designed fitting, that can be employed in bypassing gas meters to be tested without taking them out of service. The tube probe valve and the fitting can be employed with a high pressure test plug and needle probe on the high pressure side of the gas system so that the gas meter may be bypassed as disclosed in my parent application.

It is an object of this invention to make it possible to change-out any meter at anytime without the necessity of entering the residence serviced by the meter, nor interrupting the gas service to the customer. This is provided through an auxiliary supply of gas, which is sent into the residence through the service line during the time when the normal gas supply is cut off and the meter is being changed out. This is a very quick procedure requiring only a few minutes of time to disconnect the meter being removed and to replace it with a new meter. This makes it possible for the same crew to change out three or four times as many meters in a single day as compared to the older procedure.

It is a further object of this invention to provide a system that allows for the proofing or testing of the meter on location for the purpose of leaving it in if it is in satisfactory operation, or removing it if it is out of calibration. This obviates the necessity of hauling the meter back to the meter maintenance shop to accomplish tests and saves time where it develops that the meter can be left in for a longer period. It has been estimated in the past that fully sixty percent of the meters brought into the meter shop are in proper operation and could be left in for a longer period of time.

As a further feature of this invention, it is possible to provide an auxiliary supply of gas to a customer where it is necessary to replace or repair the service lines between the gas cock and the street, or even do some repair work on the main which would normally interrupt the service to the customer. The auxiliary supply of gas using the test and by-pass system of this invention takes care of the customer during the repair period, and it will be understood that more than one customer in the same vicinity may be provided with the same type of service.

The special fitting of this invention is used in the system provided and may be connected to a low-pressure gauge or manometer for the purpose of determining the reduced gas pressure delivered at the outlet of the gas meter. The fitting may also be employed for testing the domestic house piping when a leak is suspected by inserting a tube probe connected to leak detector apparatus, such as shown in U.S. Patent No. 2,796,757, providing for the pumping of air into the piping and establishing a pressurized storage tank which feeds air through a leak detector bubble tube as air is lost through this system. Bubbles passing through the bubble tube will indicate that a leak exists in visual observation.

It is a further object to provide in the fitting means for positively interrupting the gas flow to the domestic installation. This is provided through a solid tube probe insertable through the resilient valve means to cut off the gas flow. The solid probe has an opening provided with a metric thread to which a handle having matching threads can be connected. This type of thread prevents ready counterfeiting by unauthorized individuals and obviates tampering and removal of the solid probe or gas cut off means except by authorized servicemen who are equipped with the special handle for removing the solid probe.

The special fitting of this invention with which the tube probe member is employed to provide the bypass service or auxiliary service can be installed with a minimum of installation time at a low cost to provide the improved features of this invention. The invention can be practiced by conventional gas crews and the like without any high degree of training required.

The above features and objects of this invention will appear in the detailed description which follows and will be further apparent to those skilled in the art following the description of this invention.

BRIEF DESCRIPTION OF THE DRAWINGS

For the purpose of illustration of this invention, there is shown in the accompanying drawings a preferred embodiment thereof. It is to be understood that the drawings are for the purpose of example only and that the invention is not limited thereto.

In the drawings:

FIGURE 1 is a schematic view showing the use of the probe device of this invention to bypass a gas meter using the existing gas supply;

FIGURE 2 is a schematic view showing the use of an auxiliary gas supply in a bypass of a gas meter and diversion of the normal gas flow of the house gas meter to a test gas meter;

FIGURE 3 shows the employment of two tube probes to bypass a gas meter;

FIGURE 4 is a plan view showing the tube probe;

FIGURE 5 is a view in enlarged cross section showing the fitting employed with this invention, but showing the rubber valve in full lines;

FIGURE 6 is a view similar to FIGURE 5 but showing the rubber valve in section and the bypass valve members fitted with plugs for normal service;

FIGURE 7 is a view taken similarly to FIGURE 6 but showing the tube probe inserted in the fitting;

FIGURE 8 is a plan view of the molded rubber valve;

FIGURE 9 is a view partially in vertical section and partially in full lines showing the insertion of the high pressure needle probe in the high pressure test plug;

FIGURE 10 is a view partially in vertical section and partially in full lines showing the insertion of the solid tube probe for cutting off gas supply to the domestic installation;

FIGURE 11 is a plan view of the handle insertable in the solid tube probe for removing the same;

FIGURE 12 is a view partially in vertical section and partially in full lines showing the insertion of a tube probe valve member which may be connected to a leak detector apparatus; and FIGURE 13 is a view in elevation showing the connection of the leak detector apparatus to be tube probe valve member inserted in the special fitting for leak testing.

DESCRIPTION OF THE PREFERRED EMBODIMENTS

The special by-passing fitting of this invention is generally indicated by the reference numeral 20, and is shown in detail in FIGURES 5 through 8. It is used with a tube probe valve, generally indicated by the reference numeral 22, which is shown in detail in FIGURE 4. These elements will be described and then followed by a reference to the system in which they are employed.

The fitting 20 has an inlet opening 24, which is adapted to communicate with the low pressure gas line from the conventional house gas meter. The inlet opens into a valve chamber 26, which is in normal communication with an outlet 28, which leads to the gas line in the house to be serviced. A bypass gas inlet 30 is shown at the left-hand side of the fitting and is provided with a gas resistant rubber valve member 32, shown in detail in FIGure 8. The rubber valve has a slitted opening 34 provided in the cup-like extension 36 of the valve member. The sides of the opening are biased together to provide a low pressure seal. An annular flange element 38 seats within the opening 30. An inner peripheral ring-like bead element in the valve member having a semi-circular cross section is designated by the reference numeral 40 and this element functions like an O-ring to stop the flow of low pressure gas as soon as the tube probe valve 22 is inserted in the molded valve member. A brass holding ring 42 seats the valve member within an inlet 30.

The low pressure outlet 28 is likewise provided with means to seal off the gas flow between the outside of the tube probe valve member and the opening, which is accomplished by a brass ring 44 in which is seated an O-ring 46. By this means a sealing relationship is effected, such that when the tube probe valve member is inserted within the fitting, gas flow takes place from the bypass inlet 30 by way of the tube valve member, and out the low pressure outlet 28, thus effectively sealing off the gas inlet 24 except for a special situation where the gas meter under test is desired to be commnunciated with a special test gas meter. For this particular circumstance, the opening 50 at the top of the fitting, which is normally closed, is provided with a plug 52. This plug 52 can be removed and connected to a gas line leading to the special test gas meter.

The tube probe valve 22, as shown in FIGURE 4, is comprised of a nozzle-like tube element 54, which connects with a main body 56, through a special shoulder 58. The shoulder 58 serves as a stop element when the tube probe valve is inserted within the fitting in the relationship shown in FIGURE 7.

The high pressure needle probe valve, which is employed when the gas meter is bypassed from the high pressure side, is best shown in FIGURE 9 and is generally identified by the reference numeral 60. This device is used with a female threaded fitting 62 secured over an opening 64 in the high pressure gas line 66. A metal valve holder 68 has a hexagonal top portion 70 and a threaded upper portion 72, which it will be understood may be connected to a conventional threaded cap or the like, not shown, for closure when the valve is not in use. A threaded lower portion 74 fits into the fitting 62. The valve holder has an opening which has two step portions 76 and 78 separated by a shoulder 80. Within this opening is received a resilient rubber core member 82 having a pierced opening 84 to provide for insertion of the needle probe valve 86. The opening 84 is under both diametrical compression and longitudinal compression provided in part by a lock element 88 fitting within the opening 78 of the valve holder. The rubber core 82 has a slightly larger external diameter than the valve holder openings 76 and 78, respectively, in order that it may be fitted within the valve holder under compression to close the opening 84 against any high pressure fluid passage until the needle probe 86 is inserted through the valve core.

The needle probe employed with the high pressure test valve 60, shown in FIGURE 9, is generally indicated by the reference numeral 90. It is comprised of a needle probe element 86 and a body element 92.

System for testing meter on location

This system provides an auxiliary gas tank 102 to supply gas to the house being serviced while testing the house meter 100 with the intention of leaving it in use for another period of time if the meter tests out correctly. An auxiliary supply of gas in a pressure tank 102 is employed with a line leading to a regulator to 104, which is then connected to a flexible hose 106, connected to a gas cock 108. The tube probe valve member 22 is then connected to the gas cock and inserted into the bypass valve opening 30 of the special fitting. Through the insertion of the tube probe valve, communication is provided from the auxiliary gas tank 102, the pressure regulator 104, through the fitting and to the low pressure outlet opening 28 to line 110 leading to the customers' service connection.

In the system of FIGURE 2, the plug 52 has been removed from the fitting and replaced with a flexible gas line 112 communicating with a test gas meter 114. In this fashion direct communication is established from the outlet line 116 leading from the gas meter 100 to be tested through the fitting and through the flexible line 112 and to the test gas meter. In the fitting, the gas flow from the meter to be tested flows around the probe and out the auxiliary outlet 50. Accordingly, all of these connections are accomplished with one common fitting and the meter 100 to be tested can be examined on location with calibration against the test meter, avoiding the necessity of taking it back to the shop if it tests out satisfactorily. Thus, the avoidance of transfer back to a shop, which may be a long distance away, is avoided.

Bypassing gas meter through connection to the high pressure test line

FIGURE 1 shows the system where the high pressure gas line 66 is bypassed through the needle probe 86 and the flexible conduit 118 leading through a regulator 120 and through the tube probe valve 22 into the fitting. In this system the gas cock 122 is closed in the domestic installation, and after the aforementioned connections are made, the domestic gas meter 100 to be tested can be removed for service in any fashion desired. This system requires, however, an additional installation of the high pressure test plug 60, shown in FIGURE 9, with the welded collar and labor for installation, and the gas taken from the high pressure system and bypassed to service is not measured by the meter. In the system of FIGURE 2, various types of pressurized gas can be employed, and in some instances a five gallon bottle of propane with a regulator to reduce the propane to the same pressure as natural gas going to the service can be utilized. Switching from natural gas to propane as the auxiliary gas supply and then back to normal natural gas does not interfere with the pilot lights or gas burners on the gas burning appliances, and this procedure can be advantageously employed for short periods of time.

Bypassing gas meter on low pressure line

In FIGURE 3 the tube probe valve is shown employed to bypass the gas meter through the use of two valve members 22 attached to the flexible conduit 130. As there shown, the low pressure gas inlet line 132 leading into the gas meter fits into the special gas pressure fitting 20 of this invention provided on the inlet side of the meter. Likewise, a second fitting 20 is connected on the outlet side of the meter leading to the house line 110. To bypass the gas meter, two tube probe valve members 22 are both inserted into the bypass valve openings 30 of the respective fittings, thereby cutting off the supply to the gas meter and establishing direct communication from the inlet line 132 through the bypass line 130 into the house line 110. In this system, the high pressure test plug 60 and the auxiliary tank of gas 102, required for the systems of FIGURES 1 and 2, respectively, are obviated, through the provision of the extra fitting 20 on the inlet side of the gas pressure meter.

Through this invention domestic or other gas installations using gas meters can be employed with the fitting of this invention at a very low cost. This is the only capital cost item required at the installation, and because of the low expense, this represents a great advantage due to the simplicity in testing provided through this invention using the test tube probe valve member and the test system described. The overall saving provides the gas service crew with the ability to change-out in one day several times the present capacity of changing meters by conventional methods. The savings in testing meters on location and leaving them in if tested satisfactorily, as compared to the requirement for removing the meter and testing at a central location, is quite apparent. Further, the system provides for a temporary supply of gas to the service installation, while the service line is repaired or other maintenance work is done, which would normally interrupt the service. Further advantages of the system are the means for checking out the meter without interrupting the service to the customer for any reason.

Solid tube probe for cutting off gas flow through the fitting

The solid tube probe for interrupting the service and blocking off gas flow to the domestic installation is generally indicated by the reference number 140 in FIGURE 10. This device is employed when it is desired to cut off service due to one reason or another, such as house vacancy, non-payment of bills, etc., without permanent shutdown or dismantling the line. It is used with a handle 142 having a metric threaded end 144 shown in FIGURE 11.

The solid tube probe is inserted into the fitting through the slit 34 of the resilient valve 32 to pass therethrough and block flow through the outlet opening 28.

The solid probe or plugging device is comprised of a body member 146 having a tapered end 148 for ready insertion through the valve. A flange 150 at the opposite end acts as a stop and fits against the collar 42 of the valve for close engagement therewith. The diameter of the flange 150 closely approaches the internal diameter of the outlet 30 to prevent a tool being used to grasp the flange edges. A cylindrical opening 152 is provided within the solid tube probe having a tapped and threaded end portion 154, which is provided with a metric thread. The threaded end portion 154 receives the threaded portion 144 of the handle so that the plug may be readily inserted and removed by an authorized serviceman. Through the metric threading, unauthorized personnel cannot tamper with the plug, since this threading cannot be readily duplicated and will not receive the standard threads of bolts or screws obtainable at the hardware stores.

Leak detector system

The leak detection system is best shown in FIGURES 12 and 13. In this system a tube probe valve member, such as previously described by the reference numeral 22, is employed. The tube probe member is connected to an air hose 160 connected at its other end to leak detector apparatus 162. The leak detector apparatus may be of the same general type as shown in U.S. Patent No. 2,796,757. It is a portable unit using a pump 164, which may pump directly through to the air hose and the tube probe valve member into the system to be tested through the outlet line 110. When the device is pressurized, the pump handle is locked down and through valve means, not shown, communication to the system is established through a storage tank 166, which communicates with the flexible conduit 160 through the bubble jar 168. If there are any leaks in the system, air will pass from the pressurized storage tank 166, through the bubble jar 168, and into the conduit 160 and the line 110 leading to the pressurized system. The passage and flow of air from the storage tank will cause the liquid in the bubble jar to bubble indicating that there is a leak in the system. When the presence of a leak has been established, the serviceman can locate the leak by conventional means, such as by the application of soap suds or the use of a halide leak detecting lamp apparatus, as well established in the art.

Various changes and modifications may be made within this invention as will be readily apparent to those skilled in the art. Such changes and modifications are within the scope and teaching of this invention.

What is claimed is:

1. A low pressure bypass valve device for gas lines comprising a fitting having a low pressure inlet opening into a valve chamber, a low pressure outlet leading from said valve chamber and a bypass inlet opening into said valve chamber, resilient valve means normally closing said bypass inlet and a tube probe valve member having an open end engageable within the low pressure outlet opening, said valve member being receivable within said fitting in close fitting relation with the bypass inlet and the low pressure outlet and closing off communication of the low pressure inlet with the low pressure inlet with the low inlet and the low pressure outlet being diametrically opposed in the fitting and each provided with resilient ring-like sealing means adapted to engage the tube probe valve member in sealing relation, said tube probe valve member having stop means limiting its insertion into said valve chamber.

2. The valve device of claim 1 in which the low pressure tube probe valve member is connected to a leak detector apparatus for bypassing a gas meter when the service line is to be tested for gas leaks, said leak detector apparatus furnishing a pressurized fluid to the service line through the tube probe valve member and the fitting and having means to detect a leak through flow of the pressurized fluid.

3. The valve device of claim 1 in which an auxiliary opening is provided communicating with the valve chamber having means for connecting the low pressure inlet line to a test line and plug means for closing said auxiliary opening.

4. The valve device of claim 1 in which the tube probe valve member is interchangeable with a plug member which is solid at one end to cut off gas flow and has nonconventional threaded means to receive a handle to prevent removal by unauthorized personnel.

References Cited

UNITED STATES PATENTS

| | | | |
|---|---|---|---|
| 2,493,967 | 1/1950 | Hendricks | 73—40 |
| 2,731,028 | 1/1956 | McCord | 137—223 |
| 2,796,757 | 6/1957 | Peterson | 73—40 |
| 3,064,684 | 11/1962 | Hutton | 137—625.4 |
| 3,122,158 | 2/1964 | Grunsky | 73—201 XR |
| 3,131,712 | 5/1964 | Risley et al. | 137—525.1 XR |
| 3,148,690 | 9/1964 | Peterson | 73—201 XR |
| 3,173,295 | 3/1965 | Magleby | 73—201 |
| 3,296,861 | 1/1967 | Mueller et al. | 137—599.1 XR |

FOREIGN PATENTS

| | | |
|---|---|---|
| 578,876 | 7/1959 | Canada. |
| 1,256,262 | 4/1960 | France. |

LOUIS R. PRINCE, *Primary Examiner.*

JEFFREY NOLTON, *Assistant Examiner.*

U.S. Cl. X.R.

73—201; 137—599.1

UNITED STATES PATENT OFFICE
CERTIFICATE OF CORRECTION

Patent No. 3,444,724                          May 20, 1969

William V. Gilpin

It is certified that error appears in the above identified patent and that said Letters Patent are hereby corrected as shown below:

Column 6, line 63, "inlet with the low", second occurrence, should read -- outlet, the bypass --.

Signed and sealed this 16th day of June 1970.

(SEAL)
Attest:

Edward M. Fletcher, Jr.
Attesting Officer

WILLIAM E. SCHUYLER, JR.
Commissioner of Patents